(12) United States Patent
Marks

(10) Patent No.: US 12,434,435 B2
(45) Date of Patent: Oct. 7, 2025

(54) SYSTEMS AND METHODS OF SECURING ARTIFICIAL TEETH TO A DENTAL PROSTHETIC BASE WITH GRADIENT POLYMERS

(71) Applicant: DIGITAL DENTAL TECHNOLOGIES LLC, Highland Beach, FL (US)

(72) Inventor: Justin Spencer Marks, Glen Head, NY (US)

(73) Assignee: DIGITAL DENTAL TECHNOLOGIES LLC, Highland Beach, FL (US)

( * ) Notice: Subject to any disclaimer, the term of this patent is extended or adjusted under 35 U.S.C. 154(b) by 862 days.

(21) Appl. No.: 17/465,002

(22) Filed: Sep. 2, 2021

(65) Prior Publication Data

US 2023/0066191 A1 Mar. 2, 2023

(51) Int. Cl.
| | |
|---|---|
| *B29C 64/20* | (2017.01) |
| *A61C 13/00* | (2006.01) |
| *A61C 13/36* | (2006.01) |
| *B29C 64/336* | (2017.01) |
| *B33Y 30/00* | (2015.01) |
| *B33Y 80/00* | (2015.01) |

(52) U.S. Cl.
CPC .......... *B29C 64/20* (2017.08); *A61C 13/0004* (2013.01); *A61C 13/0019* (2013.01); *B29C 64/336* (2017.08); *A61C 13/1016* (2013.01); *B33Y 30/00* (2014.12); *B33Y 80/00* (2014.12)

(58) Field of Classification Search
CPC . A61C 13/0019; A61C 13/0013; B29C 64/20; B29C 64/336; B33Y 30/00
See application file for complete search history.

(56) References Cited

U.S. PATENT DOCUMENTS

| | | | |
|---|---|---|---|
| 2011/0049738 A1* | 3/2011 | Sun | A61C 13/1003 264/16 |
| 2012/0308954 A1 | 12/2012 | Dunne | |

(Continued)

FOREIGN PATENT DOCUMENTS

WO WO-2022/076925 A1 4/2022

OTHER PUBLICATIONS

International Application No. PCT/US2022/042333, International Search Report and Written Opinion, mailed Jan. 16, 2023.

*Primary Examiner* — Jerzi H Moreno Hernandez
(74) *Attorney, Agent, or Firm* — MARSHALL, GERSTEIN & BORUN LLP

(57) ABSTRACT

Systems and methods for securing artificial teeth to a dental prosthetic base with a gradient polymer are disclosed herein. An example system includes one or more processors and a memory communicatively coupled with a 3D printing device and the one or more processors. The memory stores a set of instructions thereon that, when executed by the one or more processors, cause the one or more processors to: generate a print file representative of a polymeric dental prosthesis, the print file including (i) a first material, (ii) a second material that does not chemically bond with the first material, and (iii) a gradient transition zone bonding the first material to the second material that is a gradient polymer of the first material and the second material; and print, via the 3D printing device, the polymeric dental prosthesis based on the print file.

8 Claims, 10 Drawing Sheets

(56) References Cited

U.S. PATENT DOCUMENTS

| | | |
|---|---|---|
| 2017/0347956 A1 | 12/2017 | Zegarelli |
| 2017/0360534 A1* | 12/2017 | Sun .................... A61C 13/0019 |
| 2019/0247174 A1 | 8/2019 | Zegarelli |
| 2019/0344494 A1* | 11/2019 | Cropper ................. B33Y 70/10 |
| 2021/0260829 A1* | 8/2021 | Hosseini Rankouhi ..................... B29C 64/393 |
| 2022/0110719 A1* | 4/2022 | Chavez ................. B33Y 70/00 |

* cited by examiner

SYSTEMS AND METHODS OF SECURING ARTIFICIAL TEETH TO A DENTAL PROSTHETIC BASE WITH GRADIENT POLYMERS

FIELD OF THE DISCLOSURE

The present disclosure relates to systems and methods of producing a polymeric dental prosthesis and, more particularly, to systems and methods of securing artificial teeth to a dental prosthetic base with gradient polymers.

BACKGROUND

Some polymers used in dentistry are not capable of forming chemical bonds to each other and therefore require forms of mechanical retention. Chemical bonding is not always possible between two polymers, and mechanical bonding lacks strength against the strain and stress of oral movements. Moreover, mechanical bonding methods are prone to delamination across a bilayer where the two materials are joined. Delamination between two chemically incompatible materials leaves the joint prone to breakage as well as seepage of saliva, food particles and bacteria. This can lead to degradation of the joint under strain and stress.

As can be seen, there is a need for a strong bond between multiple chemically incompatible polymer components.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Generally, and as previously mentioned, chemical bonding of dental prosthetics is preferred to mechanical bonding due to the more frequent failure of mechanical bonding under the stress and strain of the oral environment in which the prosthetics are used. However, mechanical bonding is typically performed because the polymers used to form dental prosthetics (and indeed, a wide variety of objects) are chemically incapable of bonding to one another. In order to address these and other issues, the systems and methods of the present disclosure secure artificial teeth to a dental prosthetic base with gradient polymers, wherein polymers that are incapable of adhering to one another chemically can be bonded by depositing layers of two of more materials as gradients. The mixing or transition regions of these materials as a gradient allow them to form some degree of homogeneity which can be used to bond them together. Using a gradient transition zone between two chemically incompatible materials not only strengthens the joint between them but improves hygiene by sealing the interface, protecting it from seepage.

The systems and methods of securing artificial teeth to a dental prosthetic base with gradient polymers disclosed herein provide a particular form of chemical bonding for dental prosthetics that was previously unachievable with conventional techniques. As a result, the systems and methods disclosed herein provide solutions to the problems described above and others. Moreover, without being bound by theory, the inventive systems and methods disclosed herein may also be used to bond together polymers for any application outside of dentistry.

In one aspect, a system for securing artificial teeth to a dental prosthetic base with a gradient polymer is disclosed. The system may comprise one or more processors and a memory communicatively coupled with a three-dimensional (3D) printing device and the one or more processors. The memory may store a set of instructions thereon that, when executed by the one or more processors, cause the one or more processors to: generate a print file representative of a polymeric dental prosthesis to fit within a mouth of a user, the print file including (i) a first material for a dental prosthetic base, (ii) a second material that does not chemically bond with the first material for an artificial tooth, and (iii) a gradient transition zone bonding the first material to the second material that is a gradient polymer of the first material and the second material; and print, via the 3D printing device, the polymeric dental prosthesis based on the print file, wherein the polymeric dental prosthesis includes the first material, the second material, and the gradient transition zone.

In a variation of this aspect, the gradient polymer is a plurality of gradient polymers of the first material and the second material. Further, the plurality of gradient polymers may include a first mixture, a second mixture, and a third mixture. The first mixture may include a 4:1 ratio of the first material to the second material, the second mixture may include a 1:1 ratio of the first material to the second material, and the third mixture may include a 1:4 ratio of the first material to the second material. Moreover, the first mixture may be approximately adjacent to the first material and the second material mixture, the second mixture may be approximately adjacent to the first mixture and the third mixture, and the third mixture may be approximately adjacent to the second mixture and the second material.

In another variation of this aspect, the gradient polymer further includes a third material that is different from the first material and the second material.

In yet another variation of this aspect, the gradient polymer includes equal amounts of the first material and the second material.

In still another variation of this aspect, the one or more processors are communicatively coupled with a network, and wherein the instructions further cause the one or more processors to: receive, via the network, a data file representative of a mouth of a user, and generate the print file representative of the polymeric dental prosthesis based upon the data file.

In another aspect, a method for securing artificial teeth to a dental prosthetic base with a gradient polymer is disclosed. The method may comprise: generating, by one or more processors, a print file representative of a polymeric dental prosthesis to fit within a mouth of a user, the print file including (i) a first material for a dental prosthetic base, (ii) a second material that does not chemically bond with the first material for an artificial tooth, and (iii) a gradient transition zone bonding the first material to the second material that is a gradient polymer of the first material and the second material; and print, via a 3D printing device communicatively coupled to the one or more processors, the polymeric dental prosthesis based on the print file, wherein the polymeric dental prosthesis includes the first material, the second material, and the gradient transition zone.

In a variation of this aspect, the gradient polymer is a plurality of gradient polymers of the first material and the second material. Further, the plurality of gradient polymers may include a first mixture, a second mixture, and a third mixture. The first mixture may include a 4:1 ratio of the first material to the second material, the second mixture may include a 1:1 ratio of the first material to the second material, and the third mixture may include a 1:4 ratio of the first material to the second material. Moreover, the first mixture may be approximately adjacent to the first material and the second mixture, the second mixture may be approximately adjacent to the first mixture and the third mixture, and the third mixture may be approximately adjacent to the second mixture and the second material.

In another variation of this aspect, the gradient polymer further includes a third material that is different from the first material and the second material.

In yet another variation of this aspect, the gradient polymer includes equal amounts of the first material and the second material.

In still another variation of this aspect, the method further comprises: receiving, at the one or more processors via a network, a data file representative of a mouth of a user; and generating, by the one or more processors, the print file representative of the polymeric dental prosthesis based upon the data file.

In yet another aspect, a non-transitory computer-readable storage medium having stored thereon a set of instructions, executable by at least one processor, for securing artificial teeth to a dental prosthetic base with a gradient polymer is disclosed. The instructions may comprise: instructions for generating a print file representative of a polymeric dental prosthesis to fit within a mouth of a user, the print file including (i) a first material for a dental prosthetic base, (ii) a second material that does not chemically bond with the first material for an artificial tooth, and (iii) a gradient transition zone bonding the first material to the second material that is a gradient polymer of the first material and the second material; and instructions for printing, via a 3D printing device communicatively coupled to the at least one processor, the polymeric dental prosthesis based on the print file, wherein the polymeric dental prosthesis includes the first material, the second material, and the gradient transition zone.

In a variation of this aspect, the gradient polymer is a plurality of gradient polymers of the first material and the second material. Further, the plurality of gradient polymers may include a first mixture, a second mixture, and a third mixture. The first mixture may include a 4:1 ratio of the first material to the second material, the second mixture may include a 1:1 ratio of the first material to the second material, and the third mixture may include a 1:4 ratio of the first material to the second material.

DETAILED DESCRIPTION

As used herein, directional terms such as upper, lower, upward, downwardly, top, left, right and the like are used in relation to the illustrative embodiments as they are depicted in the figures, such that the upward direction (or upper) being toward the top of the corresponding figures and the downward direction being toward the bottom of the corresponding figures.

Generally, the present embodiments relate to, inter alia, systems and methods for securing artificial teeth to a dental prosthetic base with a gradient polymer. For instance, depth information of a patient's mouth (e.g., including depth information of the patient's teeth, gums, arches, one structure and so forth) may be acquired using an infrared scanner or any suitable oral scanning device. The depth information, represented within a data file, may then be transmitted over a network to an polymeric dental prosthesis fabrication system that converts the data file into an executable format and proceeds to fabricate the polymeric dental prosthesis represented within the data file. The polymeric dental prosthesis may be comprised of and/or include two or more polymeric materials that are chemically incapable of bonding together, and may further include a gradient transition zone bonding the two or more polymeric materials together. The polymeric dental prosthesis may generally be and/or include dentures, implants, aligners, crowns, veneers, partials, relines, mouth guards, retainers, and so forth.

In an embodiment, constructing the polymeric dental prosthesis includes additive manufacturing with the two or more chemically incompatible polymers. A gradient transition zone is also developed between the two (or more) polymeric materials resulting in improved bond strength. Of course, the exact parameters for the gradient transition zone will depend on the materials used and the type of additive manufacturing used. For example, the gradient transition zone may be formed by 3D printing, and as such, the polymeric dental prosthesis may be produced on any commercially available 3D printer capable of depositing two or more materials in a single build. Moreover, several commercially available software design platforms and/or 3D slicing software are suitable for the parameterization and specific dimension configuration of the gradient transition zone and the polymeric dental prosthesis.

It is to be understood that the polymers described herein should not be limited to polymer types typically and/or otherwise used in the dental industry and/or any other industry. As a result, the polymers discussed herein may be used in any relevant industry/setting for any suitable purpose.

Figure 1A:
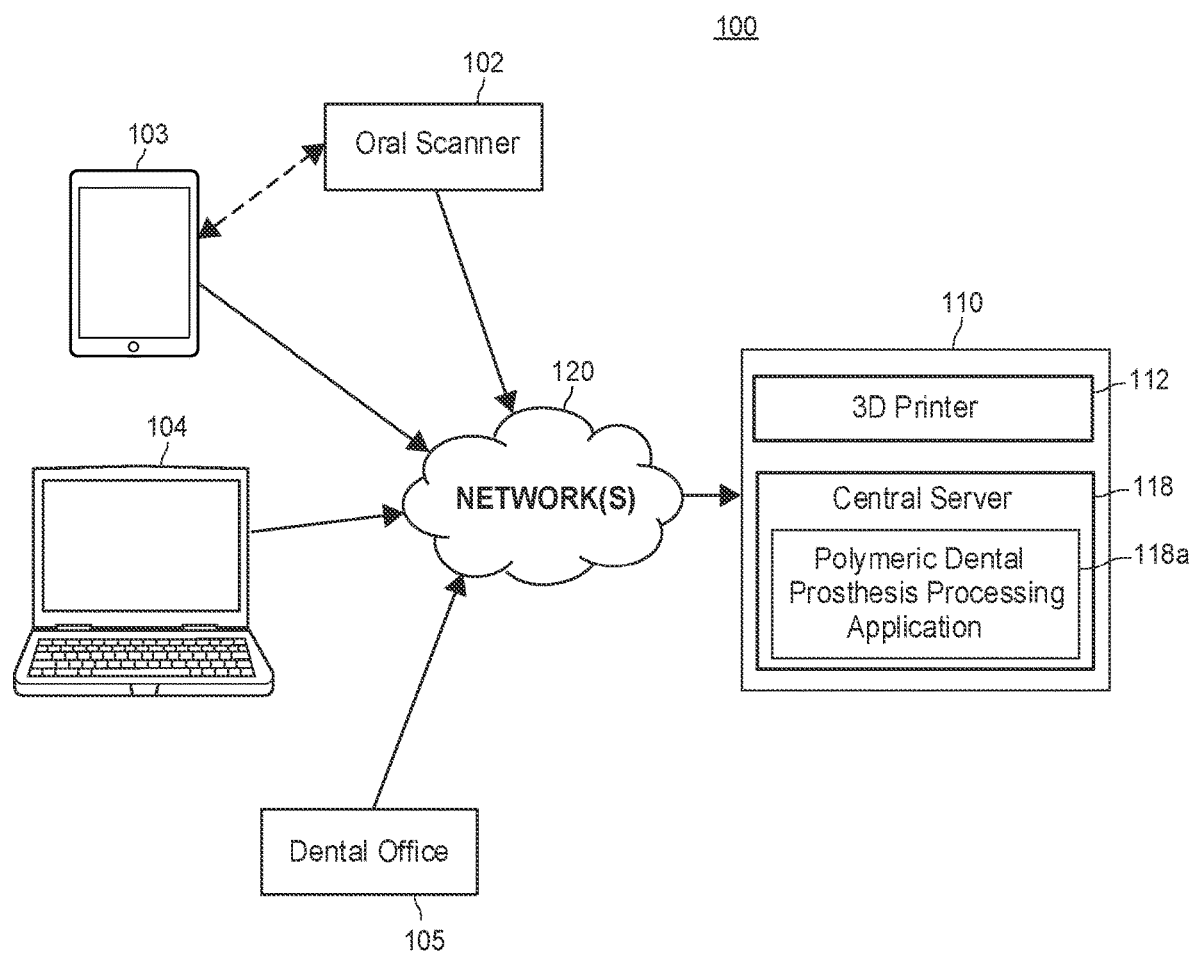
FIG. 1A is an example system for securing artificial teeth to a dental prosthetic base with a gradient polymer, in accordance with embodiments described herein.

FIG. 1A is an example system 100 for securing artificial teeth to a dental prosthetic base with a gradient polymer, in accordance with embodiments described herein. Generally, the example system 100 may facilitate the end-to-end processing of a polymeric dental prosthesis from an initial scan of a patient's (also referenced herein as a "user") mouth to the fabrication of a corresponding polymeric dental prosthesis that includes a gradient transition zone. The example system 100 may include an oral scanner 102, user computing devices 103 and 104, a dental office 105, a polymeric dental prosthesis fabrication system 110 (also referenced herein as a "polymeric dental prosthesis processing system" and "polymeric dental prosthesis system"), and a network 120.

The oral scanner 102 (or an oral scanner at the dental office 105) may generally capture images of the interior of a patient's mouth with an RGB camera or other suitable camera, and may transmit those images to a connected computing device (e.g., user computing device 103, 104, polymeric dental prosthesis fabrication system 110) for processing. The connected computing device may operate/execute an application or platform configured to receive the images captured by the oral scanner 102, and to process the captured images such that the data contained in the images is represented as part of a data file that is transmitted to/utilized by the polymeric dental prosthesis fabrication system 110. The oral scanner 102 may mobilize the platform of the connected computing device using native iOS or android apps running on the connected computing device (which includes one or more processors, e.g., one or more scanning processors). In some embodiments, the oral scanner 102 is an infrared scanner including an emitter (not shown, also sometimes referred to as a "projector") and receiver (not shown, e.g., a sensor).

In certain aspects, the oral scanner 102 and/or the connected computing device may create a 3D model of a patient's mouth interior using raw depth feed data (e.g. from the infrared scanner and/or from a laser scanner) instead of an RGB camera. Of course, it is also possible for the oral scanner 102 and/or the connected computing device to create a 3D model of a patient's mouth interior using RGB data and a photogrammetry pipeline. Generally, the raw depth data becomes more accurate as the receiver is moved closer to objects in the mouth, including teeth or gum tissue. Thus, in some examples, a human operator will press the oral scanner 102 into contact with a patient's teeth or gums. However, holding the oral scanner 102 a few inches away from a patient's teeth will still produce accurate depth information; and, even if the oral scanner 102 is a few meters away from the target, depth information may still be obtained. The signal from the receiver can be created by a single paired infrared emitter and receiver, which typically costs less to produce than the RGB camera found on most modern smartphones. In certain aspects, the raw depth data is in the form of a point cloud (e.g., a dataset that represents object(s) in space).

In order to produce the raw depth feed data, the oral scanner 102 (e.g., via an emitter) emits dots that are reflected within the patient's mouth interior and subsequently received by the oral scanner 102 (e.g., via a receiver) and processed by the oral scanner 102 and/or a connected computing device (e.g., user computing device 103, 104, polymeric dental prosthesis fabrication system 110). This processing generally produces a raw depth feed, which is an integer, usually measured in microns, indicating the distance between the oral scanner 102 and the object being scanned (e.g., a tooth or gum). The oral scanner 102 and/or the connected computing device may then compile the raw depth feed data and/or other suitable data (e.g., image/pixel data) received by the oral scanner 102 into a data file of any suitable format, for example, the industry standard OBJ and STL formats. In certain aspects, a native application can connect the raw depth feed data and/or images created by the oral scanner 102 to an application programming interface (API) that turns the data into a 3D model as part of a computer-aided design (CAD) file format that digitally represents the 3D model of the patient's mouth interior. Additionally, in some aspects, the software executed on the oral scanner 102 and/or the connected computing device may use real-time web communication technologies (such as those used in video chatting applications) to stream data from the scanner 102 and/or the connected computing device to a server (e.g., central server 118) for rendering. In any event, once the scans are created, they can be stored for future retrieval in an S3-compatible object storage system.

In some aspects, the oral scanner 102 may emit/receive approximately 30,000 dots per second. Further, in some aspects, a human operator may operate the oral scanner 102 such that a very large percentage (e.g., 90%) of the emitted dots hit a tooth or other target objects/areas in a patient's mouth. In certain aspects, the connected computing device may provide an alarm or indication to the human operator if less than a certain percentage (e.g., 90%) of the emitted dots are not hitting the target objects/areas within the patient's mouth.

In addition, although the example of FIG. 1A shows the oral scanner 102 optionally connected to the user computing device 103 (e.g., a smartphone), it should be understood that the data from the oral scanner 102 may be received and processed by any suitable processing device. Accordingly, in the example of FIG. 1A, the data obtained by the oral scanner 102 may be processed by the user computing devices 103, 104, at the dental office 105, and/or at the polymeric dental prosthesis fabrication system 110.

The polymeric dental prosthesis fabrication system 110 is generally configured to receive data files from a user computing device (e.g., any of devices/locations 102-105) that are representative of a patient's mouth, and to autonomously fabricate a polymeric dental prosthesis to fit within the patient's mouth. The polymeric dental prosthesis fabrication system 110 includes a 3D printer 112 and a central server 118. The central server 118 may include a polymeric dental prosthesis processing application 118a that is generally configured to manage the processing of the polymeric dental prosthesis throughout the various stages of fabrication, e.g., printing, scanning, and finishing. The polymeric dental prosthesis processing application 118a may communicate with the 3D printer 112 in order to transmit processing instructions related to the polymeric dental prosthesis that are included as part of the executable code generated by the user computing devices 103, 104, the dental office 105, and/or the polymeric dental prosthesis fabrication system 110 (e.g., central server 118) based on the data file received from the oral scanner 102.

Figure 1B:
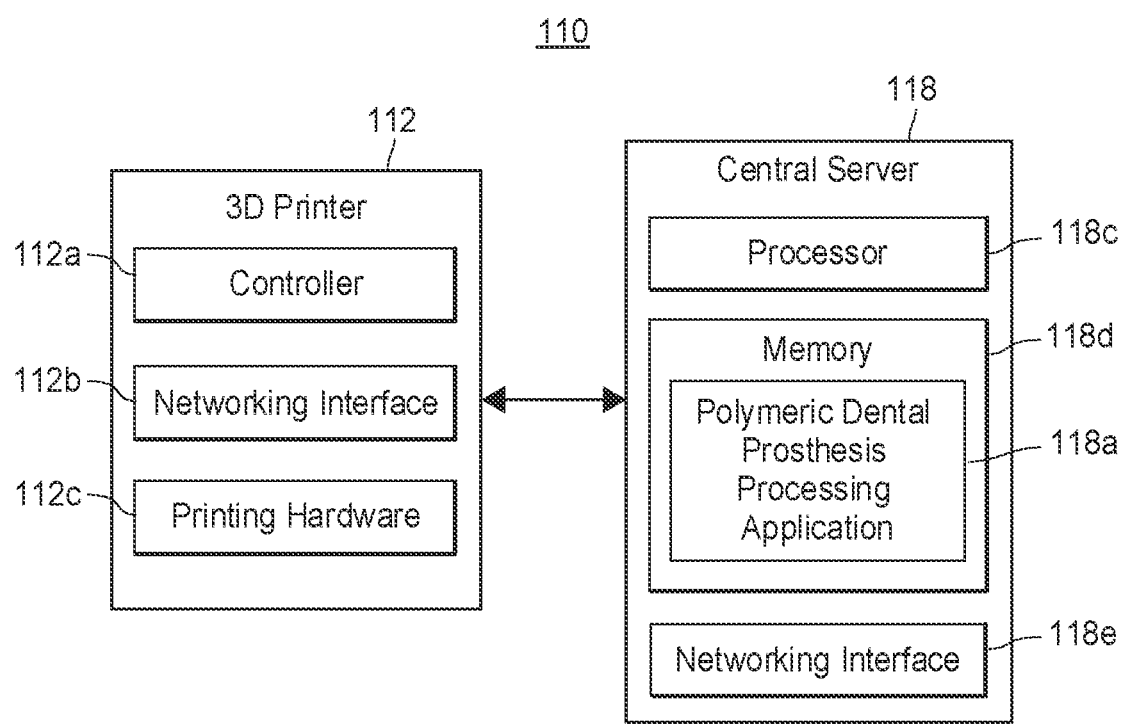
FIG. 1B is the polymeric dental prosthesis fabrication system of FIG. 1A for 3D printing and automated processing of a polymeric dental prosthesis, in accordance with embodiments described herein.

FIG. 1B is the polymeric dental prosthesis fabrication system 110 of FIG. 1A for 3D printing and automated processing of a polymeric dental prosthesis, in accordance with embodiments described herein. Generally, each of the components of the polymeric dental prosthesis fabrication system 110 may include various sub-components configured to enable the components to perform the various functions described herein. For example, in reference to FIG. 1B, the 3D printer 112 may include a controller 112a, a networking interface 112b, and printing hardware 112c. Of course, it is to be appreciated that the controller 112a may be a microcontroller that includes one or more processors (e.g., central processing unit (CPU)), an input/output interface, and/or one or more memories. Moreover, in certain aspects, the 3D printer 112 may store all or a portion of the polymeric dental prosthesis processing application 118a locally, such that the 3D printer 112 may independently perform tasks as part of the polymeric dental prosthesis fabrication without communication with the central server 118. It should also be appreciated that any mention of a processor, a memory, and/or a controller may reference one or more processors, one or more memories, and one or more controllers.

In any event, the 3D printer 112 may include the controller 112a, the networking interface 112b, and the printing hardware 112c. Broadly, the 3D printer 112 may receive executable code from the central server 118 and/or a patient device (e.g., oral scanner 102, user computing device 103, 104, and/or dental office 105) via a wireless connection (e.g., via network 120) and/or a hardwired connection through the networking interface 112b. The controller 112a may then interpret the executable code and automatically cause the printing hardware 112c to proceed with printing a polymeric dental prosthesis in accordance with the specifications provided within the executable code.

In particular, the printing hardware 112c may be configured to print the polymeric dental prosthesis using at least a first material and a second material that does not chemically bond with the first material. As an example, the first material may be a polymer that is configured to be a dental prosthetic base and the second material may be a polymer that is configured to be an artificial tooth. In this example, the controller 112a may cause the printing hardware 112c to include a gradient transition zone that bonds the first material to the second material. The gradient transition zone may be a gradient polymer (e.g., a mixture) that is comprised of the first material and the second material in a particular proportion. In one aspect, the gradient polymer may be comprised of equal amounts of the first material and the second material.

When the 3D printer 112 has finished printing the oral device specified within the executable code, the central server 118 (via the polymeric dental prosthesis processing application 118a) may instruct a scanner (not shown) to scan the polymeric dental prosthesis in order to determine whether or not any defects/deviations exist relative to the 3D model embodied in the data file. Moreover, in the event that a feature of the polymeric dental prosthesis exceeds a deviation threshold, the central server 118 (via the polymeric dental prosthesis processing application 118a) may instruct a finishing module (not shown) to finish the identified feature of the polymeric dental prosthesis such that the feature is within the deviation threshold after finishing. Of course, the central server 118 may instruct the scanner and the finishing module to automatically re-scan and re-finish the polymeric dental prosthesis any number of times in order to ensure that all features of the polymeric dental prosthesis do not exceed the deviation threshold relative to the corresponding dimension of the feature of the polymeric dental prosthesis specified within the data file.

As illustrated in FIG. 1B, the central server 118 may include a processor 118c, a memory 118d containing the polymeric dental prosthesis processing application 118a, and a networking interface 118e. The memory 118d (as well as the memories included as part of the controller 112a) may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 118d (as well as the memories included as part of the controller 112a) may store an operating system (OS) (e.g., Microsoft Windows, Linux, UNIX, etc.) capable of facilitating the functionalities, apps, methods, or other software as discussed herein. In addition, the memory 118d (as well as the memories included as part of the controller 112a) may also store machine readable instructions, including any of one or more application(s) (e.g., polymeric dental prosthesis processing application 118a), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, the polymeric dental prosthesis processing application 118a, where each may be configured to facilitate their various functionalities discussed herein. It should be appreciated that one or more other applications may be envisioned and that are executed by the processor 118c and/or the controller 112a.

The processor 118c may be connected to the memory 118d via a computer bus responsible for transmitting electronic data, data packets, or otherwise electronic signals to and from the processor 118c and the memory 118d in order to implement or perform the machine readable instructions, methods, processes, elements or limitations, as illustrated, depicted, or described for the various flowcharts, illustrations, diagrams, figures, and/or other disclosure herein. The processor 118c may interface with memory 118d via the computer bus to execute an operating system (OS). The processor 118c may also interface with the memory 118d via the computer bus to create, read, update, delete, or otherwise access or interact with the data stored in the memory 118d and/or an external database (not shown) (e.g., a relational database, such as Oracle, DB2, MySQL, or a NoSQL based database, such as MongoDB).

The networking interface 118e (as well as the networking interface 112b) may be configured to communicate (e.g., send and receive) data via one or more external/network port(s) to one or more networks or local terminals, such as computer network 120. In some aspects, the central server 118 may include a client-server platform technology such as ASP.NET, Java J2EE, Ruby on Rails, Node.js, a web service or online API, responsive for receiving and responding to electronic requests. The central server 118 may implement the client-server platform technology that may interact, via the computer bus, with the memory 118d (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

In various aspects, the central server 118 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to the computer network 120. In some embodiments, the computer network 120 may comprise a private network or local area network (LAN). Additionally, or alternatively, the computer network 120 may comprise a public network such as the Internet.

The central server 118 may further include or implement an operator interface configured to present information to an administrator or operator and/or receive inputs from the administrator or operator. For example, an operator interface may provide a display screen on a computing device located at a polymeric dental prosthesis fabrication facility containing the polymeric dental prosthesis fabrication system 110, and/or the central server 118 may generate the operator interface on a patient's computing device (e.g., user computing devices 103, 104). The central server 118 may also provide I/O components (e.g., ports, capacitive or resistive touch sensitive input panels, keys, buttons, lights, LEDs), which may be directly accessible via, or attached to, the central server 118 or may be indirectly accessible via or attached to a terminal. According to some aspects, an administrator/operator (e.g., a dentist or dental technician), and/or a patient may access the central server 118 to review information, make changes, input data files, initiate polymeric dental prosthesis processing, and/or perform other functions.

As described herein, in some aspects, the central server 118 may perform the functionalities as discussed herein as part of a "cloud" network or may otherwise communicate with other hardware or software components within the cloud to send, retrieve, or otherwise analyze data or information described herein.

In general, a computer program or computer based product, application (e.g., polymeric dental prosthesis processing application 118a), or code may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor 118c and/or the controller 112a (e.g., working in connection with the respective operating system in memory 118d) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

Figure 2A:
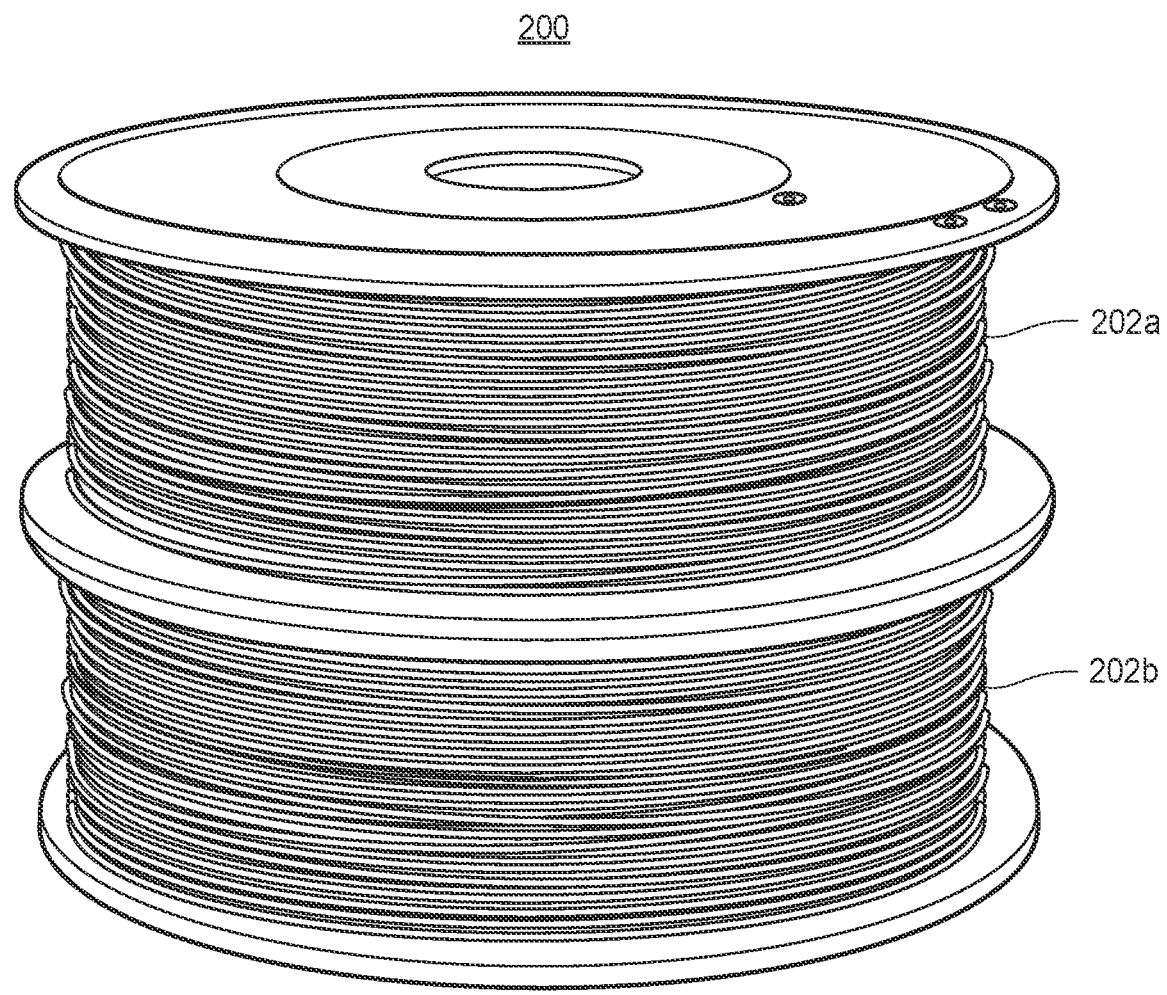
FIG. 2A is a perspective view of two types of chemically incompatible polymers usable in accordance with embodiments described herein.

FIG. 2A is a perspective view 200 of two types of chemically incompatible polymers (a first polymer 202a, a second polymer 202b) usable in accordance with embodiments described herein. Generally, the first polymer 202a and the second polymer 202b may be chemically incompatible insofar as the second polymer 202b may not chemically bond with the first polymer 202a. As an example, the first polymer 202a may be a nylon filament, which may be configured for use as a dental prosthetic base (e.g., a prosthetic gum line) for a polymeric dental prosthesis. Further, the second polymer 202b may be a polymethyl methacrylate filament, which may be configured for use as an artificial tooth within a polymeric dental prosthesis. Thus, in this example, the first polymer 202a and the second polymer 202b may be formed (e.g., deposited by the 3D printer 112) into various components (e.g., artificial teeth and gums) that require bonding together. It is to be appreciated that the above example is merely for ease of discussion, and that the first polymer 202a and the second polymer 202b may be any suitable polymers that do not chemically bond together.

Figure 2B:
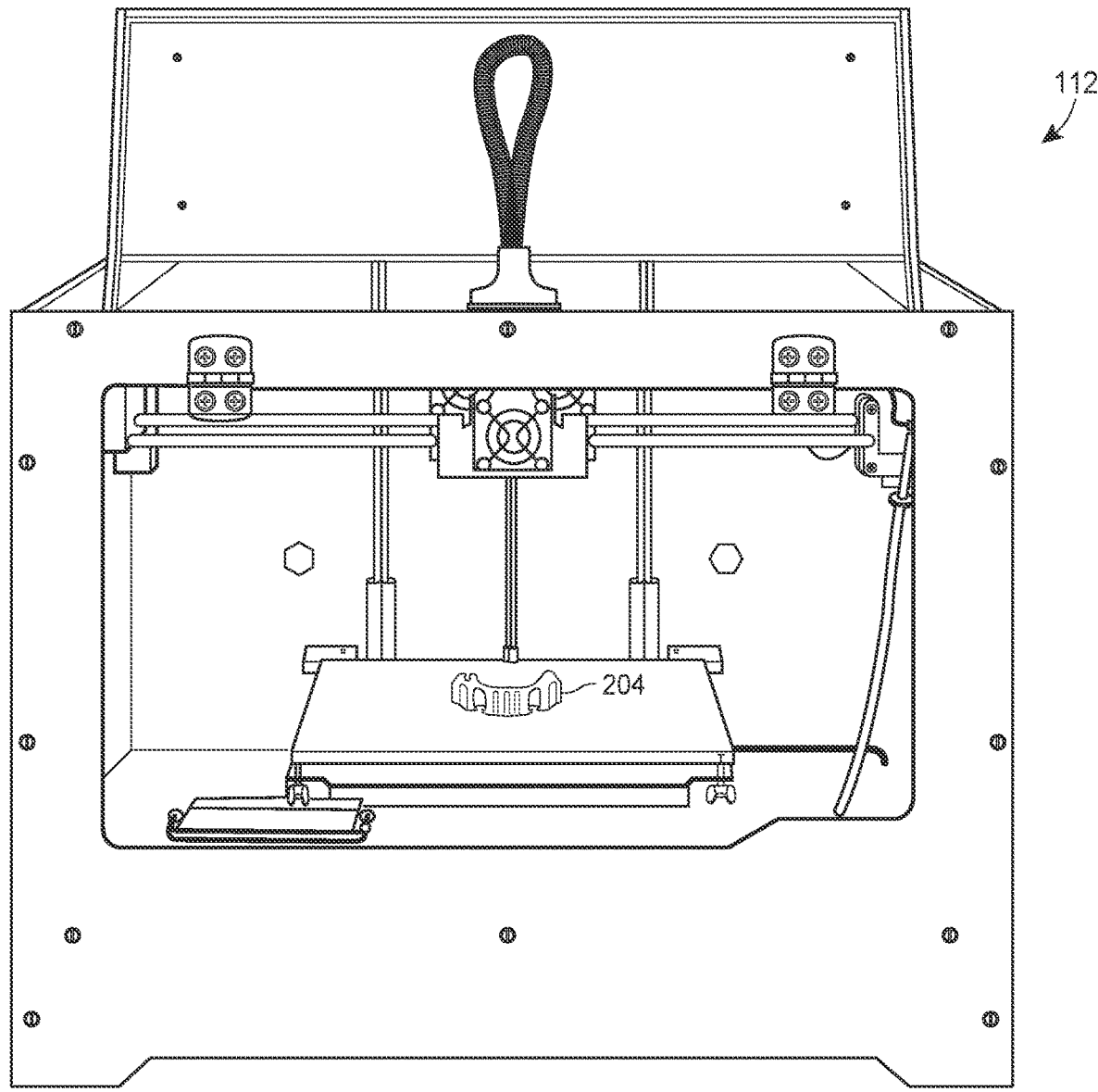
FIG. 2B is a front elevation view of a dental prosthetic base in the 3D printer of FIG. 1B, in accordance with embodiments described herein.

As an illustration of the prior example, FIG. 2B is a front elevation view of a dental prosthetic base 204 in the 3D printer 112 of FIG. 1B, in accordance with embodiments described herein. The dental prosthetic base 204 may be comprised of the first polymer 202a of FIG. 2A. The 3D printer 112 may proceed to print a gradient polymer of the first polymer 202a and the second polymer 202b onto the dental prosthetic base 204 to create a gradient transition zone. Thereafter, the 3D printer 112 may print the second polymer 202b onto the gradient transition zone to create and simultaneously bond the artificial teeth onto the dental prosthetic base 204.

Figure 3A:
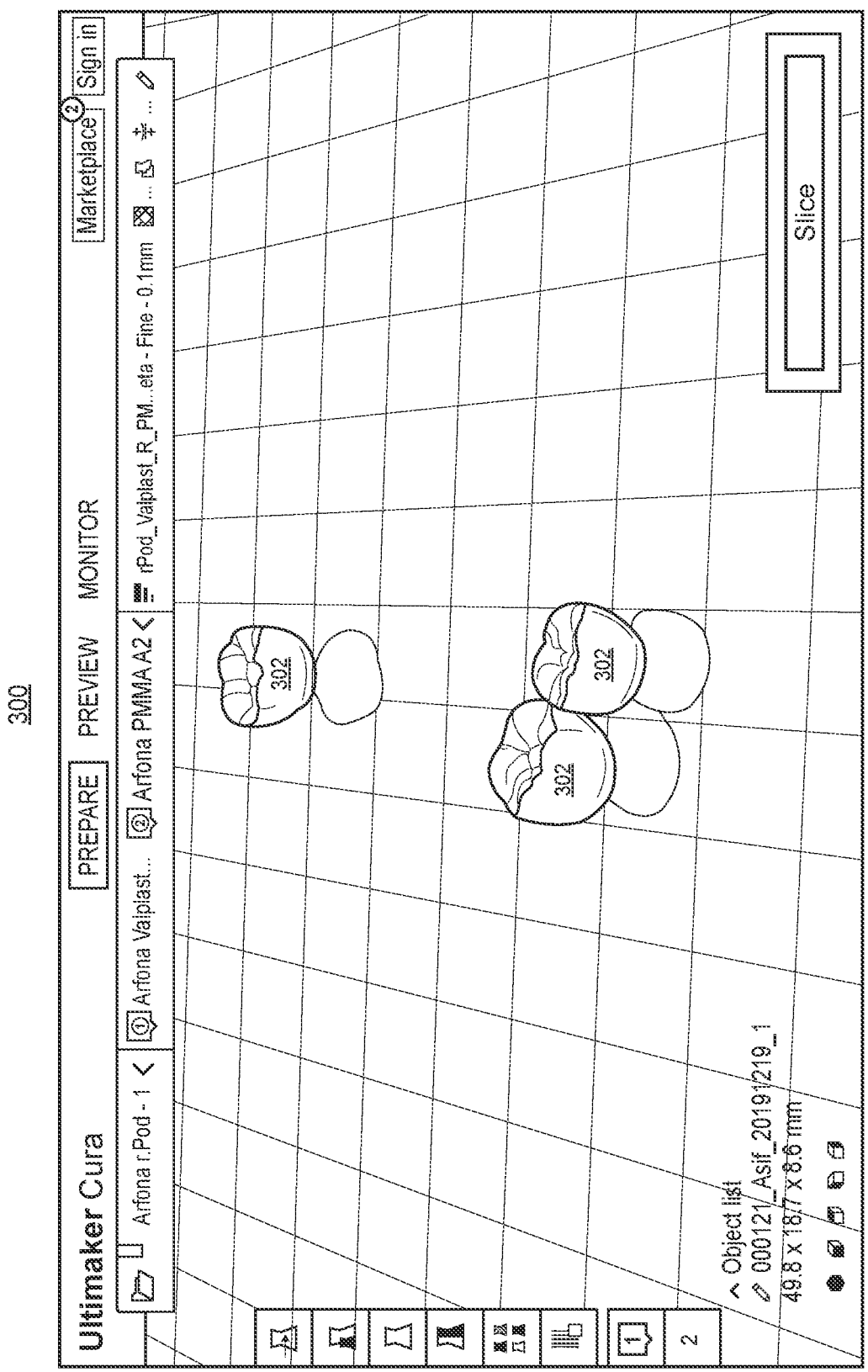
FIG. 3A is a graphical user interface (GUI) of a model of artificial teeth included as part of a print file generated by the polymeric dental prosthesis fabrication system of FIG. 1B, in accordance with embodiments described herein.

FIG. 3A is a graphical user interface (GUI) 300 of a model of artificial teeth 302 included as part of a print file generated by the polymeric dental prosthesis fabrication system 110 of FIG. 1B, in accordance with embodiments described herein. As illustrated in FIG. 3A, the polymeric dental prosthesis fabrication system 110 (e.g., polymeric dental prosthesis processing application 118a) may render the artificial teeth 302 as segmented from a corresponding dental prosthetic base that may be combined to form a completed polymeric dental prosthesis to fit within a mouth of a user. However, in certain embodiments, the polymeric dental prosthesis processing application 118a may not separately render the artificial teeth 302 from the corresponding dental prosthetic base. In any event, the example GUI 300 may be displayed to a user as part of the execution of the polymeric dental prosthesis processing application 118a once the print file is generated.

Figure 3B:
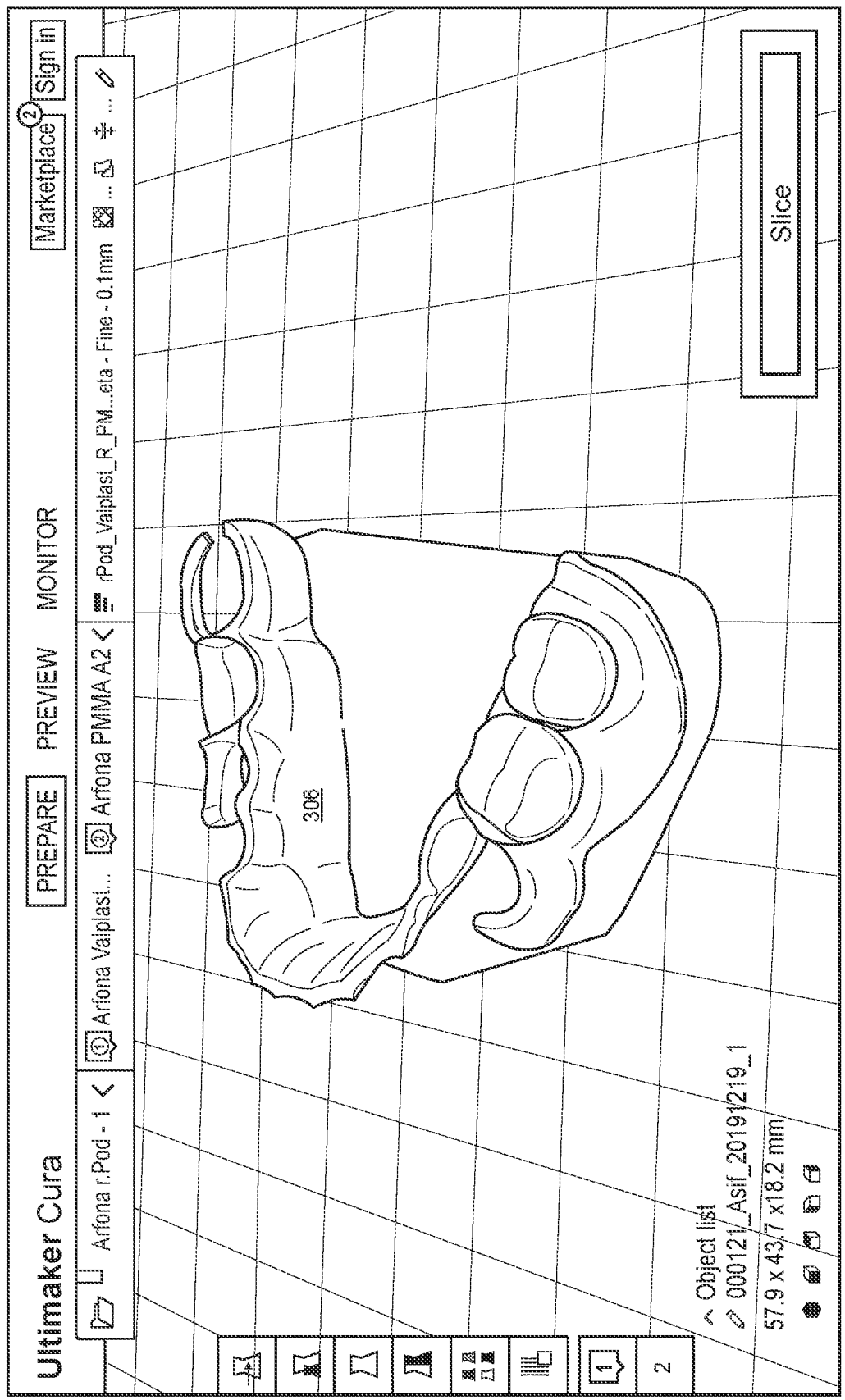
FIG. 3B is a GUI of a model of a dental prosthetic base included as part of a print file generated by the polymeric dental prosthesis fabrication system of FIG. 1B, in accordance with embodiments described herein.

Similarly, FIG. 3B is a GUI 304 of a model of a dental prosthetic base 306 included as part of a print file generated by the polymeric dental prosthesis fabrication system 110 of FIG. 1B, in accordance with embodiments described herein. As illustrated in FIG. 3B, the polymeric dental prosthesis fabrication system 110 (e.g., polymeric dental prosthesis processing application 118a) may render the dental prosthetic base 306 as segmented from a corresponding artificial tooth/teeth (e.g., artificial teeth 302) that may be combined to form a completed polymeric dental prosthesis to fit within a mouth of a user. However, in certain embodiments, the polymeric dental prosthesis processing application 118a may not separately render the dental prosthetic base 306 from the corresponding artificial tooth/teeth. In any event, the example GUI 304 may be displayed to a user as part of the execution of the polymeric dental prosthesis processing application 118a once the print file is generated.

Figure 3C:
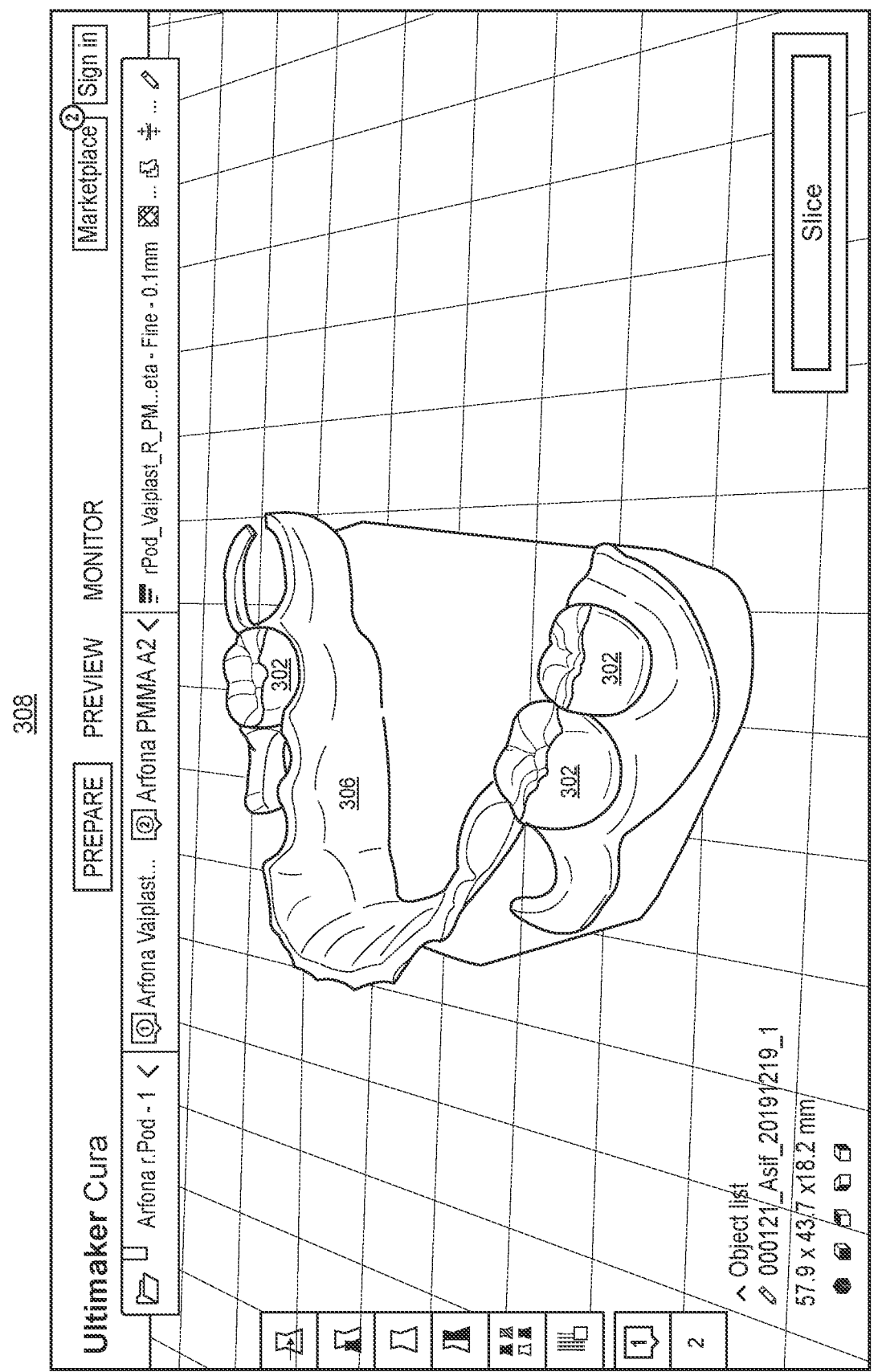
FIG. 3C is a GUI of a combined model of the model of artificial teeth of FIG. 3A and the model of the dental prosthetic base of FIG. 3B included as part of a print file generated by the polymeric dental prosthesis fabrication system of FIG. 1B, in accordance with embodiments described herein.

FIG. 3C is a GUI 308 of a combined model of the model of artificial teeth 302 of FIG. 3A and the model of the dental prosthetic base 306 of FIG. 3B included as part of a print file generated by the polymeric dental prosthesis fabrication system 110 of FIG. 1B, in accordance with embodiments described herein. The example GUI 308 may be displayed to a user as part of the execution of the polymeric dental prosthesis processing application 118a once the print file is generated. Additionally, or alternatively, the example GUI 308 may include a gradient transition zone (not shown) configured to bond the artificial teeth 302 to the dental prosthetic base 306.

Figure 3D:
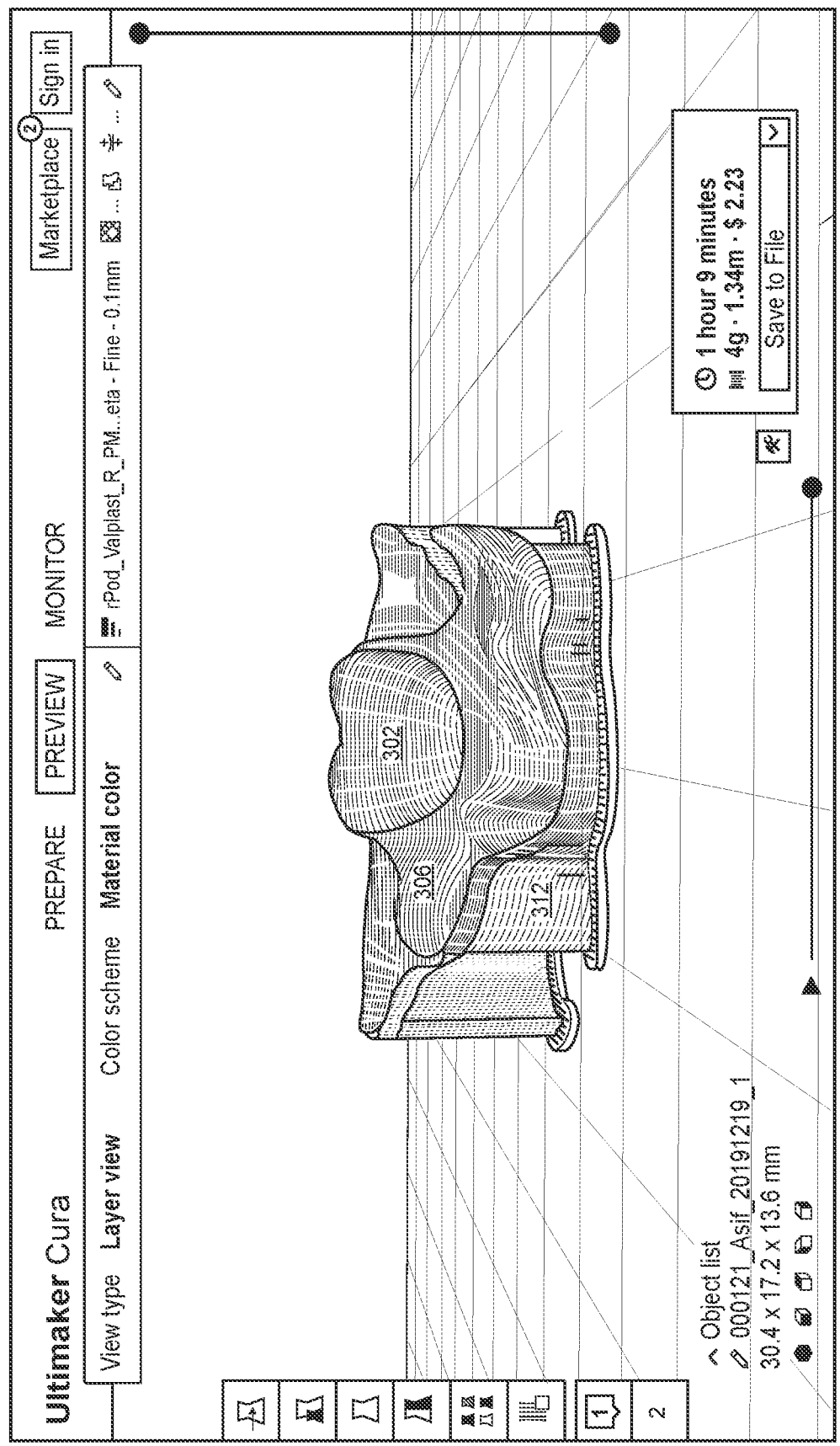
FIG. 3D is a GUI of the combined model of FIG. 3C with a processing base, in accordance with embodiments described herein.

FIG. 3D is a GUI 310 of the combined model of FIG. 3C with a processing base 312, in accordance with embodiments described herein. The GUI 310 may be a side elevation view of the combined model of FIG. 3C, and as such, may provide a different perspective of the combined model for display to a user. Generally, the processing base 312 may be a dissolvable material that is utilized by the polymeric dental prosthesis fabrication system 110 as a base upon which the system 110 may print and/or otherwise fabricate the dental prosthetic base 306 and the artificial teeth 302. More specifically, the processing base 312 may be configured to be removed from the combined model of the artificial teeth 302 and the prosthetic dental base 306 prior to shipment to a user.

For example, as part of the fabrication process performed by the polymeric dental prosthesis fabrication system 110, the dental prosthetic base 306, and by association, the artificial teeth 302 may be printed and/or otherwise fabricated onto the processing base 312. Once the polymeric dental prosthesis fabrication system 110 determines (e.g., by the polymeric dental prosthesis processing application 118*a*) that the combined model satisfies the parametric specifications of the print file, the system 110 may place the combined model into a bath of solution configured to dissolve and/or otherwise remove/separate the processing base 312 from the combined model represented in the GUI 310. However, another component of determining that the combined model is ready to be removed from the processing base 312 may be confirming that the dental prosthetic base 306 and the artificial teeth 302 are appropriately joined together by a gradient transition zone.

Figure 3E:
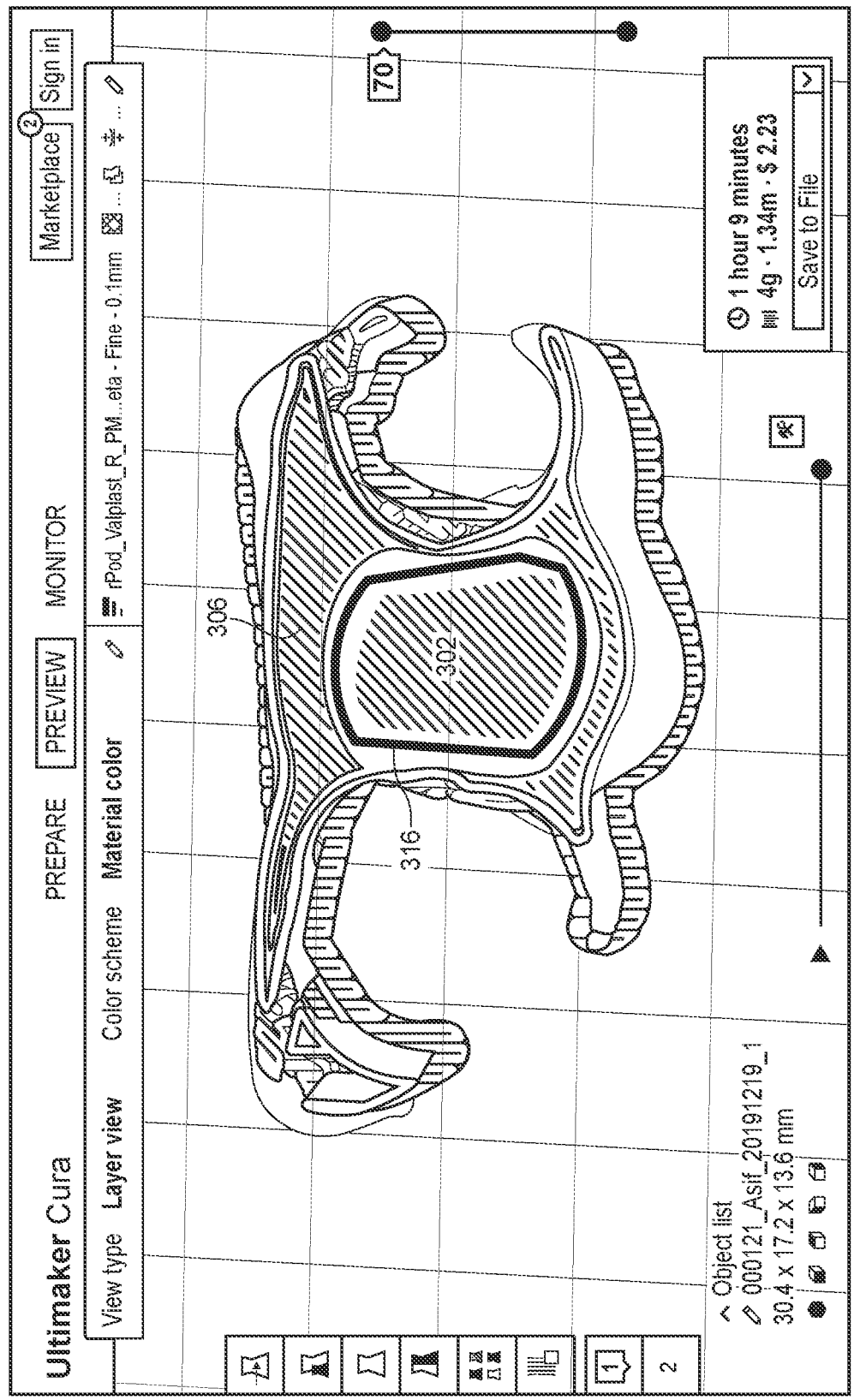
FIG. 3E is a GUI of the combined model and processing base of FIG. 3D including a gradient transition zone, in accordance with embodiments described herein.

Accordingly, FIG. 3E is a GUI 314 of the combined model (e.g., artificial teeth 302 and dental prosthetic base 306) and processing base 312 of FIG. 3D including a gradient transition zone 316, in accordance with embodiments described herein. The GUI 314 may generally include a top plan layer view of the combined model and processing base 312 that features a cutaway of a particular layer of the combined model including the gradient transition zone 316. The top plan layer view may be produced by slicing software included as part of the polymeric dental prosthesis processing application 118*a*. For example, 3D slicing software may be included as part of the application 118*a*, and may be used to generate a toolpath for the polymers (e.g., first polymer 202*a* and second polymer 202*b*) to be deposited by the 3D printer (e.g., 3D printer 112).

As part of the toolpath generation, the 3D slicing software may indicate the gradient transition zone 316 that includes a gradient polymer of the polymers used to create the artificial teeth 302 and the dental prosthetic base 306. The gradient polymer included in the gradient transition zone 316 may generally bond the artificial teeth 302 to the dental prosthetic base 306, and may include one or more mixtures of the two polymers used to create the artificial teeth 302 and the dental prosthetic base 306. For example, the gradient transition zone 316 may be comprised of three distinct gradient polymers that include a 4:1 ratio, a 1:1 ratio, and a 1:4 ratio of the first polymer (e.g., first polymer 202*a*) to the second polymer (e.g., second polymer 202*b*), respectively.

In certain aspects, the gradient transition zone 316 may include additional materials other than the first and second polymers (e.g., 202*a*, 202*b*) used to create the artificial teeth 302 and the dental prosthetic base 306 and/or combinations thereof. For example, the gradient transition zone 316 may include three or more materials (e.g., three different polymers). Moreover, it should be understood that the gradient transition zone 316 may create a bond between two or more otherwise chemically incompatible polymers of any suitable type, such as to transition from a relatively hard substance to a relatively soft substance. Thus, as previously mentioned, the gradient transition zone 316 and corresponding methods and systems described herein may facilitate the creation of any dental prosthetic requiring such a bond, including dentures, implants, aligners, crowns, veneers, partials, relines, mouth guards (e.g., night guard appliances), retainers, and the like.

Additionally, it should be understood that the gradient transition zone 316 may include any suitable number of layers of gradient polymer. For example, the gradient transition zone 316 may include 3 to 5 layers of gradient polymer in order to secure the artificial teeth 302 to the dental prosthetic base 306. Each of these layers of the gradient polymer may include a different ratio of the first and second polymers 202*a*, 202*b*, and as such, may include greater amounts of the first polymer in areas of the gradient transition zone 316 that are physically proximate to the prosthetic dental base 306 than areas physically proximate to the artificial teeth 302, and may include greater amounts of the second polymer 202*b* in areas of the gradient transition zone 316 that are physically proximate to the artificial teeth 302 than areas physically proximate to the dental prosthetic base 306. Of course, it will be appreciated that any suitable number of gradient polymer layers, such as one, dozens, hundreds, etc. may be used.

Figure 4:
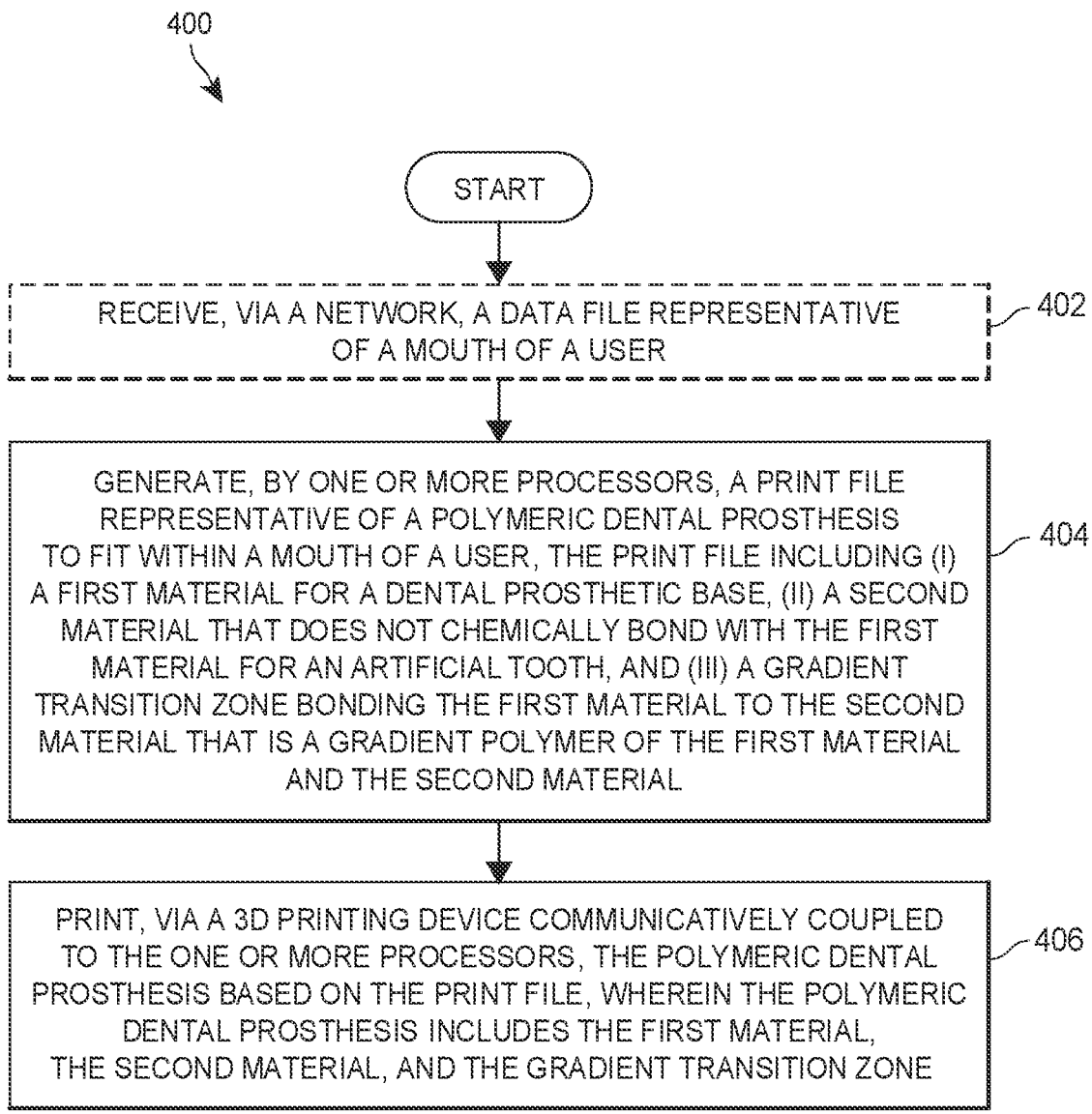
FIG. 4 is a flowchart representative of a method for securing artificial teeth to a dental prosthetic base with a gradient polymer, in accordance with embodiments described herein.

FIG. 4 is a flowchart representative of a method 400 for securing artificial teeth to a dental prosthetic base with a gradient polymer, in accordance with embodiments described herein. It is to be appreciated that some/all of the actions described herein in reference to the method 400 may be performed by any of the polymeric dental prosthesis processing application 118*a*, the 3D printer 112, the processor 118*c*, and/or any other suitable component(s) or combinations thereof, as described herein. Moreover, it is to be understood that some/all of the actions described herein in reference to the method 400 may be optionally performed.

In any event, the method 400 optionally includes receiving, at the one or more processors via a network, a data file representative of a mouth of a user (optional block 402). For example, a user may independently and/or with the assistance of a dentist/dental technician perform oral scanning of the user's mouth (e.g., with oral scanner 102 and/or ad dental office 105) to generate the data file representative of the mouth of the user. Once generated, the user and/or dentist/dental technician may upload the data file to a network (e.g., network 120) for transmission to the polymeric dental prosthesis fabrication system 110.

When the polymeric dental prosthesis fabrication system 110 receives the data file, the system 110 may also generate (e.g., by one or more processors 118*c*) a print file representative of a polymeric dental prosthesis to fit within the mouth of the user based upon the data file.

The method 400 may further includes generating, by one or more processors, a print file representative of a polymeric dental prosthesis to fit within a mouth of a user (block 404). The print file may include (i) a first material for a dental prosthetic base, (ii) a second material that does not chemically bond with the first material for an artificial tooth, and (iii) a gradient transition zone bonding the first material to the second material that is a gradient polymer of the first material and the second material. In certain aspects, the gradient polymer is a plurality of gradient polymers of the first material and the second material.

In some aspects, the plurality of gradient polymers includes a first mixture, a second mixture, and a third mixture. Further, the first mixture may include a 4:1 ratio of the first material to the second material, the second mixture may include a 1:1 ratio of the first material to the second material, and the third mixture may include a 1:4 ratio of the first material to the second material. Moreover, the first mixture may be approximately adjacent to the first material and the second mixture, the second mixture may be approximately adjacent to the first mixture and the third mixture, and the third mixture may be approximately adjacent to the second mixture and the second material. However, in some aspects, the gradient polymer includes equal amounts of the first material and the second material.

In certain aspects, the gradient polymer may further include a third material that is different from the first material and the second material.

The method 400 may further include printing, via a 3D printing device communicatively coupled to the one or more processors, the polymeric dental prosthesis based on the print file (block 406). Once printed, the polymeric dental prosthesis includes the first material, the second material, and the gradient transition zone, such that the first material and the second material are bonded together by the gradient transition zone without the need of mechanical bonding.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A system comprising:
   one or more processors; and
   a memory communicatively coupled with a 3D printing device and the one or more processors, the memory storing a set of instructions thereon that, when executed by the one or more processors, cause the one or more processors to:
   generate a print file representative of a polymeric dental prosthesis to fit within a mouth of a user, the print file including (i) a first material for a dental prosthetic base, (ii) a second material that does not chemically bond with the first material for an artificial tooth, and (iii) a gradient transition zone bonding the first material to the second material that is a gradient polymer of the first material and the second material, and
   print, via the 3D printing device, the polymeric dental prosthesis based on the print file, wherein the polymeric dental prosthesis includes the first material, the second material, and the gradient transition zone.

2. The system of claim 1, wherein the gradient polymer is a plurality of gradient polymers of the first material and the second material.

3. The system of claim 2, wherein the plurality of gradient polymers includes a first mixture, a second mixture, and a third mixture.

4. The system of claim 3, wherein the first mixture includes a 4:1 ratio of the first material to the second material, the second mixture includes a 1:1 ratio of the first material to the second material, and the third mixture includes a 1:4 ratio of the first material to the second material.

5. The system of claim 3, wherein the first mixture is adjacent to the first material and the second mixture, the second mixture is adjacent to the first mixture and the third mixture, and the third mixture is adjacent to the second mixture and the second material.

6. The system of claim 1, wherein the gradient polymer further includes a third material that is different from the first material and the second material.

7. The system of claim 1, wherein the gradient polymer includes equal amounts of the first material and the second material.

8. The system of claim 1, wherein the one or more processors are communicatively coupled with a network, and wherein the instructions further cause the one or more processors to:
   receive, via the network, a data file representative of the mouth of the user, and
   generate the print file representative of the polymeric dental prosthesis based upon the data file.

* * * * *